United States Patent
Nishiyama

(10) Patent No.: US 6,227,168 B1
(45) Date of Patent: May 8, 2001

(54) FUEL-INJECTION SYSTEM FOR ENGINE AND PROCESS FOR DEFINING THE BEGINNING OF PRESSURE DROP IN COMMON RAIL

(75) Inventor: Yasuhiro Nishiyama, Kanagawa (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 09/345,438

(22) Filed: Jun. 30, 1999

(30) Foreign Application Priority Data

Jun. 30, 1998 (JP) .................................................. 10-184210

(51) Int. Cl.$^7$ ........................................................ F02M 1/00
(52) U.S. Cl. ........................................... 123/456; 123/478
(58) Field of Search .................................. 123/456, 478, 123/490; 73/119 A

(56) References Cited

U.S. PATENT DOCUMENTS

| | | | |
|---|---|---|---|
| 5,975,056 | * 11/1999 | Augustin et al. | 123/456 |
| 6,024,072 | * 11/1999 | Hamada | 123/456 |
| 6,035,829 | * 3/2000 | Hartke et al. | 123/456 |
| 6,058,912 | * 5/2000 | Rembold et al. | 123/456 |
| 6,085,727 | * 7/2000 | Nakano | 123/456 |
| 6,088,647 | * 7/2000 | Hemberger et al. | 123/478 |
| 6,095,120 | * 8/2000 | Neugebauer | 123/478 |
| 6,102,009 | * 8/2000 | Nishiyama | 123/456 |

FOREIGN PATENT DOCUMENTS

| | | |
|---|---|---|
| 6060020 | 12/1985 | (JP) . |
| 8210174 | 8/1996 | (JP) . |
| 1047137 | 2/1998 | (JP) . |
| 11101149 | 4/1999 | (JP) . |

* cited by examiner

*Primary Examiner*—John Kwon
(74) *Attorney, Agent, or Firm*—Browdy and Neimark

(57) ABSTRACT

In a fuel-injection method and an apparatus therefor, an output timing of a injection command signal is decided in such a manner that a fuel-injection timing is in matching with a basic desired injection timing, thereby to help ensure the improvement in the exhaust gases performance ~of the engine. The invention includes the apparatus to perform the steps of obtaining pressure data by filtering waveforms of the detected common rail pressure, calculating an approximate straight line Ld by the pressure data from a preselected time to a time $T_3$ of at least the first smallest value after the start of the pressure drop, and defining a time, at which a difference between a pressure data and an approximate straight line Ld is the largest value, as the timing $T_2$ of the start of the pressure drop. Based on the time $T_2$, a time lag $\Delta Td$ is calculated, that spans from an output timing $T_0$ of injection command signal to a fuel-injection timing $T_1$. The output timing $T_0$ of injection command signal defined at a time of going backwards by the time lag $\Delta Td$ from a basic desired injection timing Td, which is obtained in accordance with the engine operating conditions.

5 Claims, 7 Drawing Sheets

FUEL-INJECTION SYSTEM FOR ENGINE AND PROCESS FOR DEFINING THE BEGINNING OF PRESSURE DROP IN COMMON RAIL

BACKGROUND OF THE INVENTION

1. Field of the Invention

The present invention relates to a fuel-injection method and an apparatus therefor, in which fuel delivered through a common rail is charged from injectors into combustion chambers, and further relates to a process for defining the beginning of pressure drop in the common rail, which is applicable to the common-rail, fuel-injection system.

2. Description of the Prior Art

In a typical fuel-injection control for engines such as diesel engines, a common-rail, fuel-injection system is conventionally known, in which the fuel injected is highly intensified in pressure and the fuel-injection characteristics such as a timing and quantity of fuel injected per cycle are adequately controlled in accordance with the engine operating conditions. On most common-rail, fuel-injection systems, the fuel pressurized at a preselected pressure is stored in a fuel supply line common to the injectors and the consequent stored fuel is injected from each injector into the associated combustion chamber. In order to inject the pressurized fuel at the individual fuel injector with the optimal fuel delivery condition for the engine operation, a controller unit regulates the fuel pressure in the common rail and the control valves each installed in the individual fuel injector.

A conventional common-rail, fuel-injection system will be explained below with reference to FIG. 7. The fuel delivery to injectors 1 is carried out through a common rail 2 and injection lines 3, each of which is a part of the fuel-flow line. A fuel feed pump 6 draws fuel from a fuel tank 4 through a fuel filter 5 and forces it under a preselected pressure to a fuel-supply pump 8 through a fuel line 7. The fuel-supply pump 8 is of, for example, a fuel-supply plunger pump driven by the engine, which intensifies the fuel to a high pressure determined depending on the engine operating conditions, and supplies the pressurized fuel into the common rail 2 through another fuel line 9. The fuel, thus supplied, is stored in the common rail 2 at the preselected high pressure and forced to the injectors 1 from the common rail 2. The injectors 1 are provided in compliance with the type of engines (the number of the cylinders) and controlled with a controller unit 12 of an electronic control unit to thereby inject the fuel, supplied from the common rail 2, to the associated combustion chambers with an adequate timing and metered quantity of fuel. The injection pressure of the fuel sprayed out of the injectors 1 is substantially equal with the pressure of fuel stored in the common rail 2, that is, the common rail pressure, which is thus regulated in order to control the injection pressure.

The fuel relieved from the fuel-supply pump 8 is allowed to flow back the fuel tank 4 through a fuel-return line 10. The unconsumed fuel remaining in each injector 1 out of the fuel fed through the injection lines 3 into the injectors 1 may return to the fuel tank 4 through a fuel-recovery line 11. The controller unit 12 is applied with various signals of sensors monitoring the engine operating conditions, such as a cylinder identifying sensor and a crankshaft position sensor for detecting the engine rpm Ne, an accelerator pedal sensor for detecting the depression Acc of an accelerator pedal, an engine coolant temperature sensor, an intake manifold pressure sensor and the like. The controller unit 12 may regulate the fuel-injection characteristics, that is, the injection timing and the quantity of fuel injected out of the injectors 1, depending on the applied signals, to thereby allow the engine to operate as fuel-efficient as possible. Moreover, the controller unit 12 is applied with a detected single as to a common-rail pressure reported from a pressure sensor 13 installed in the common rail 2. Injection of fuel out of the injectors 1 consumes the fuel in the common rail 2, causing the pressure drop in the common-rail pressure, at which the controller unit 12 regulates the discharge of the fuel-supply pump 8 so as to keep the common-rail pressure constant.

As described in Japanese Patent Publication No. 60020/1985, the prior common-rail, fuel-injection system controls the fuel-injection pressure to the desired value in accordance with the engine operating conditions, while calculating the fuel-injection characteristics, that is, the quantity of fuel metered to be injected, which quantity is defined by the pressure and duration for injection per cycle, and the timing of fuel injection, in compliance with the engine operating conditions, thereby achieving the fuel-injection characteristics optimal for the engine operating conditions. The common-rail pressure defining the injection pressure is intensified by the fuel-supply pump, while regulated to a desired injection pressure by means of a pressure regulator valve.

In the prior common-rail, fuel-injection system, the controller unit applies the command pulses for the injection command signals to the solenoid-operated valves, which are provided in the injectors, each to each injector. The solenoid-operated valves energized with the command pulses lift the needle valves to open the injection holes at the nozzle tips of the injectors 1, resulting in allowing the fuel charges into the combustion chambers. However, a time-lag is usually present, spanning from the time when the controller unit issues the command pulse to be signaled to the solenoid-operated valve to the time when the fuel is actually injected out of the nozzle holes of the injectors. Such time lag arises from a response delay inherent in the driving circuit, that is, a delay spanning from the time of signaling the command pulse from the controller unit to the solenoid to the time of the actual energization of the solenoid, and a mechanical delay in the injectors, during which the needle valve is made to lift after the energization of the solenoid to thereby allow the fuel injection out of the injector. Moreover, even if the timing when the command pulses issued from the controller unit turn "on" is precisely maintained at constant, every injector has tended to vary or scatter in the timing of the beginning of the fuel injection owing to characteristic difference in the individual injectors, aging or the like.

In most conventional fuel-injection systems dealing with the problem as described just above, the time lag is considered to be constant so that the scattering for every injector in the time lag is ignored. Accordingly, the optimal combustion of fuel can not be appreciated due to characteristic difference in the individual injectors, aging or the like. This results in the major problems in which the exhaust gas control becomes inferior and vibration occurs in the engine owing to the difference in combustion timing among the individual cylinders.

In contrast, disclosed in Japanese Patent Laid-Open No. 210174/1996 is a method of detecting fuel-injection timing and an apparatus therefor, which has for its object to determine accurately the fuel-injection timing in the diesel engines. According to this prior art, the fuel pressure is monitored at a fuel line connecting a fuel injection pump with fuel-injection nozzles, while a pressure drop greater than the preselected value is detected, which happens first after the monitored fuel pressure reaches a design high pressure. The initiation of the first pressure drop is identified as the timing of the beginning of the fuel injection.

Unlike the common-rail fuel-injection system, nevertheless, the method and apparatus for detecting fuel-injection timing, disclosed in the above publication, belong to a fuel-injection system including a fuel distributor pump to meter and direct fuel to the injectors, or an inline fuel injection pump.

On the other hand, Japanese Patent Laid-Open No. 47137/1998 discloses therein a method of detecting fuel-injection timing and an apparatus therefor in a common-rail, fuel-injection system. A pressure sensor in the common rail detects the timing when the pressure drop happens in the common rail pressure after the fuel injection out of the injectors. The actual timing of the beginning of the fuel injection is calculated, in compliance with the timing of pressure drop, by going backwards by the length of time during which the pressure waves are transmitted from the injection nozzles to the common rail. The deviation of the resultant actual timing from the desired timing of the beginning of the fuel injection is stored for compensating the desired timing of the beginning of the next fuel injection. That is to say, the above citation discloses the conception of compensating the desired timing of the start of the fuel injection with the detected timing of the start of pressure drop in the common rail pressure.

However, since the pressure drop in the common rail pressure due to the fuel injection is normally accompanied by pulsative waves, it is actually very hard to detect accurately the timing of the beginning of the pressure drop in the common rail pressure. In this regard, the above-cited Japanese Patent Laid-Open No. 47137/1998 discloses no teaching of the specific measures about how to detect the timing of the beginning of the pressure drop of the common rail pressure.

Based on the recognition that defining closely the timing of the beginning of pressure drop is critical for accurate control of the timing of the initiation of the fuel injection on the individual injectors in the common-rail, fuel-injection system, the inventors have already proposed a method of defining accurately the timing of the beginning of the pressure drop in the common rail pressure, which is explained in co-pending senior Japanese Patent Laid-Open No. 101149/1999, and further confirmed the results satisfactory to some degree. Nevertheless, there is still the room for improvement and, therefore, how to define strictly the timing of the beginning of pressure drop is the major subject for accurately controlling the timing of the initiation of the fuel injection on the individual injectors in the common-rail, fuel-injection system.

SUMMARY OF THE INVENTION

A primary object of the present invention is to overcome the problems in the prior art as having been described above, and to provide a fuel-injection method and an apparatus therefor and further provide a method of defining a timing of the beginning of pressure drop in a common rail pressure, which is suitably applicable to the fuel-injection method. The present invention is made by detecting the common rail pressure with paying attention to the fact that the common rail pressure falls in accordance with the quantity of fuel injected out of the injectors on every fuel-injection, irrespective of the scattering on the fuel-injection timings of the individual injector, and finding with accuracy the actual timing of the beginning of the fuel injection in the injectors, depending on the timing at which the common rail pressure starts to fall down.

The present invention is concerned with a fuel-injection method for an engine, comprising the steps of; storing a common rail with a fuel delivered by the means of a fuel-supply pump, injecting the fuel from the common rail into combustion chambers through discharge orifices formed in injectors that are actuated with injection command signals, making a decision about a basic desired injection timing in compliance with engine operating conditions at present by using a basic desired injection timing data which is previously defined in accordance with the engine operating conditions, finding an injection lag spanning from an output timing of the injection command signal to an injection timing at which the fuel injection is made to start, by a function previously defined of a variable of a time at which a pressure drop starts in the common rail pressure at least after the start of the fuel injection, and making a decision about the output of the injection command signal in accordance with the basic desired injection timing and the injection lag.

The present invention is further concerned with a fuel-injection apparatus for an engine, comprising; a common rail for storing therein a fuel forced by the action of a fuel-supply pump, injectors having discharge orifices through which the fuel from the common rail is injected into combustion chambers, means for monitoring engine operating conditions, a pressure sensor for monitoring a pressure in the common rail, and a controller unit for deciding a basic desired injection timing in compliance with the engine operating conditions at present by using a basic desired injection timing data which is previously defined in accordance with the engine operating conditions detected with the engine condition monitoring means, and further for applying the injectors with the injecting command signal in accordance with the basic desired injection timing, wherein the controller unit finds an injection lag spanning from the output timing of the injection command signal to an injection timing at which the fuel injection is made to start, by a function previously defined of a variable of a time at which a pressure drop starts in the common rail pressure at least after the start of the fuel injection, and makes a decision about the output of the injection command signal in accordance with the basic desired injection timing and the injection lag.

In one aspect of the present invention, a fuel-injection method is disclosed, wherein the output timing of the injection command signal for the recent fuel injection in the injectors is decided at a time going backwards by the injection lag found at the fuel injection last time in the injectors from the basic desired injection timing.

In another aspect of the present invention, a fuel-injection method is disclosed, wherein the timing of the start of the pressure drop in the common rail pressure is defined as a time at which a difference between a pressure data and an approximate straight line is the largest value, the pressure data being obtained by filtering process of waveforms of the detected common rail pressure, and the approximate straight line being calculated, with respect to a curve represented on coordinates of the time and pressure data, by the use of the pressure data spanning from a preselected time before the pressure drop in the common rail pressure to a time of at least the first smallest value after the start of the pressure drop.

In another aspect of the present invention, the start of pressure drop in the common rail pressure may be given by filtering the common rail pressure through a low-pass filer to thereby obtain pressure data, and then approximating a curve of pressure variation during the pressure drop on coordinates of the time and the pressure data by the least square method to thereby obtain an approximate straight line of the curve during the pressure drop till the pressure data becomes the first smallest value. As a result, the start of pressure drop in the common pressure is defined as the time on the time-axis at which the difference between the approximate straight line and the pressure data becomes the largest value. According to the present invention, thus, the time of the time-axis at which the difference between the pressure data becomes the largest value, or the time at which the pressure data exceeds the approximate straight line with the largest deviation during a length of time till the first smallest after the start of the pressure drop in the common rail pressure, is regarded as the timing of the start of the pressure drop in the common rail pressure. Moreover, the timing of the start of pressure drop in the common rail pressure defined as described above can be safely applied in practice for finding experimentally an injection lag between the injection command timing and the fuel-injection timing.

According to another aspect of the present invention, the injection lag about from the output timing of the injection command signal to the fuel-injection timing is individually calculated for each of the injectors. The difference for every cylinder, or the difference in distance between the discharge orifice of the injector and the pressure sensor for the common rail pressure, may affect the length of time during which the pressure variation transmits. It will be understood that the difference for every cylinder included the individual scattering of the injectors, injection lines and the like.

The present invention is further concerned with a method of defining a start of pressure drop in a common rail pressure, comprised of the steps of; filtering processing waveforms of the detected common rail pressure to thereby obtain pressure data, calculating an approximate straight line of a curve of pressure data variation on coordinates of the time and pressure data by making use of the pressure data spanning from a preselected time before the pressure drop to a time of at least the first smallest value after the start of the pressure drop, and defining a time, at which a difference between a pressure data and an approximate straight line is the largest, as the timing of the start of the pressure drop in the common rail pressure.

It is preferred that the preselected time before the pressure drop is the timing of issuing the fuel-injection command signal. Moreover, the common rail pressure may be detected based on the output timing of the injection command signal or may be detected dependent on the degree of stability on the common rail pressure before signaling of the command pulse. The approximate straight line may be calculated by the use of the least square method. In either case, the present invention makes it possible to define accurately the timing of the start of pressure drop.

As apparent from the foregoing description, the present invention develops to find the injection lag between the output timing of the injection command signal and the fuel-injection timing by a previously defined function, depending on the start of pressure drop in the common rail pressure after the fuel-injection, thereby making a decision about the output timing of the subsequent injection command signal in accordance with both the basic desired injection timing and the injection lag. That is to say, the length of time spanning from the output of the injection command signal to the start of the actual fuel injection, or the injection lag, may be found by the previously defined function, dependent on the timing of the start of pressure drop in the common rail pressure, which is calculated based on the pressure data of the common rail pressure detected at the pressure sensor. The output timing of the injection command signal to be applied to the injectors is defined based both of the injection lag found as described above and the basic desired injection timing found as the optimal injection timing in accordance with the engine operating conditions such as accelerator pedal depression and the engine rpm or the like. Accordingly, the actual fuel-injection may begin at the basic desired injection timing designed previously so as to help ensure the most suitable exhaust gases and engine output performances, irrespective of variations in the injectors such as aging in the response to the injection command signals and the scattering in fuel-injection timing for every injector, thereby resulting in improving the exhaust gases and engine output performances.

In contrast, on the prior fuel-injection system in which the injection lag between the output timing of the fuel-injection command signal and the actual fuel-injection timing is considered to be constant without paying attention to the scattering in the injection lag, even if the injection command signals have been initially designed so as to signal at the optimal timing, it may be possible that the start of the fuel-injection becomes out of the optimal timing owing to the aging in the injection lag and, in addition, the individual injector has usually the scattering or deviation in the start timing of the fuel-injection. For the reasons as described above, the vibration and inferior exhaust gas control have occurred in the prior engines owing to the scattering in the timing of the combustion sequentially carried out in the individual cylinder of an engine, to say nothing of the individual engine. Nevertheless, the fuel-injection method the apparatus according to the present invention makes it possible to achieve the actual fuel injection at the optimal basic desired injection timing, resulting in preventing the vibration and inferior exhaust gas control.

Moreover, according another aspect of the present invention, the start of the fuel injection may be decided by processing the information detected at the common rail pressure sensor that is conventionally incorporated in the common-rail system and, therefore, there is no need of developing a novel pressure sensor for making a decision about the start timing of the fuel injection. Unlike the fuel-injection system having the distributor injection pump or inline fuel injection pump, the number of pressure sensors is not necessarily the same as the number of injection lines connecting the fuel injection pump with the injectors, so that no increase of the number of the parts may be necessary, with resulting in cost saving. Moreover, detecting the common rail pressure in the common-rail, fuel-injection system is more concurrently susceptible to the large changes in the common rail fuel pressure due to the engine operating conditions, compared with another prior system in which the information effective for detecting is obtained by comparing the pressure in the injection lines connecting the fuel-injection pump and the injectors to the a design pressure threshold.

The fuel-injection method and apparatus therefor of the present invention adopt the method of defining the start of pressure drop in the common rail pressure comprised of the steps of calculating an approximate straight line of a curve of the pressure variation of the common rail pressure after filtering by making use of the pressure data till a time of at least the first smallest value on the curve, and defining a time, at which a difference between the pressure data and the approximate straight line is the largest, as the timing of the start of the pressure drop in the common rail pressure. This makes the load on the DSP lighter and the influence on the quantity of fuel charge more reduced, compared with the senior co-pending application in Japan.

Other objects and features of the present invention will be more apparent to those skilled in the art on consideration of the accompanying drawings and following specification wherein are disclosed preferred embodiments of the invention with the understanding that such variations, modifications and elimination of parts may be made therein as fall within the scope of the appended claims without departing from the spirit of the invention.

DESCRIPTION OF THE PREFERRED EMBODIMENTS

A preferred embodiment of a fuel-injection system according to the present invention will be explained in detail hereinafter with reference to the accompanying drawings.

Figure 7:
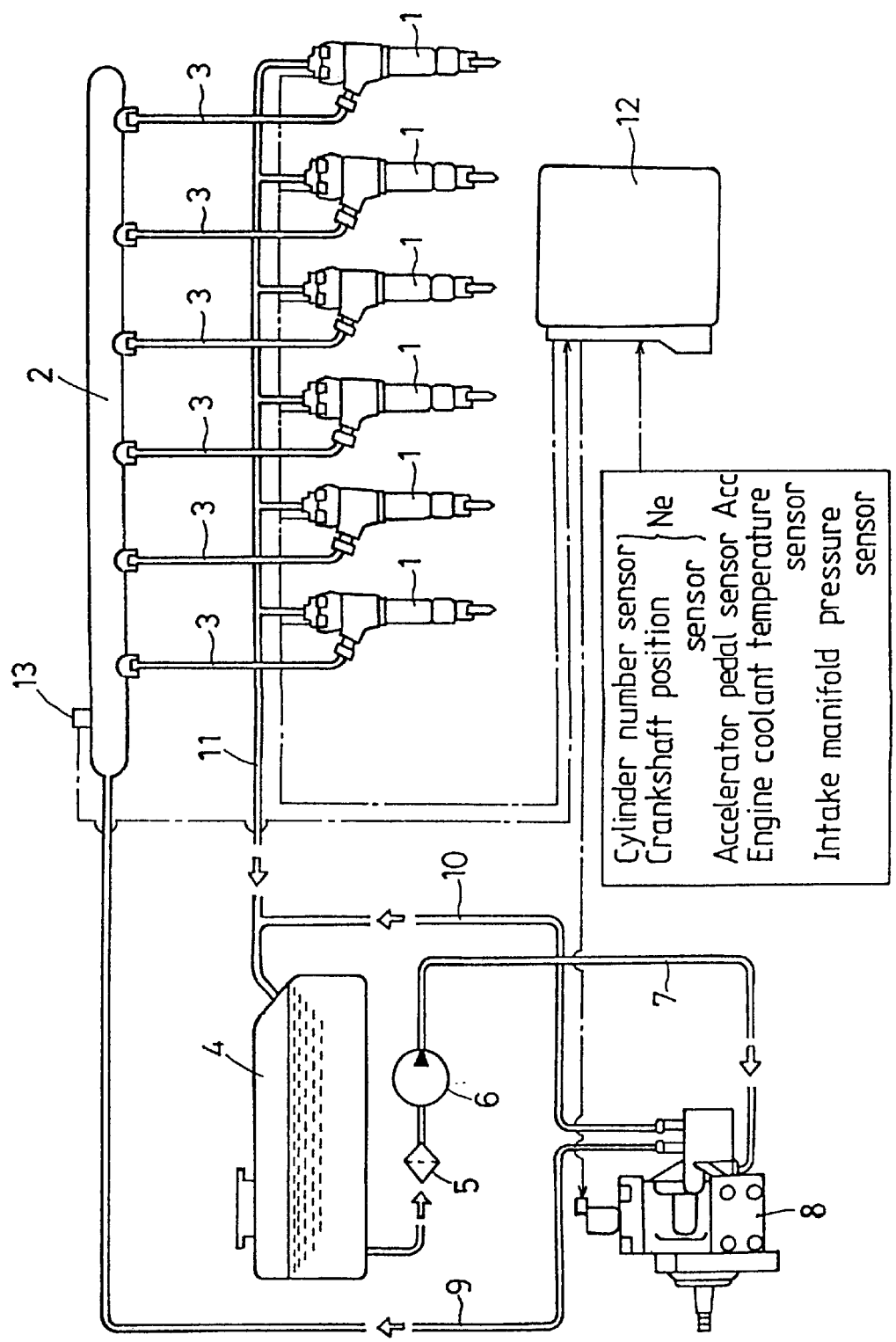
FIG. 7 is a schematic illustration of an exemplary common-rail, fuel-injection system.

A fuel-injection method and an apparatus therefor in internal combustion engines are suitable for use in the common-rail, fuel-injection system shown in FIG. 7. Most of components of the system, thus, are the same as previously described. To that extent, the components have been given the same reference characters as shown in FIG. 7, so that the previous description will be applicable.

Figure 1:
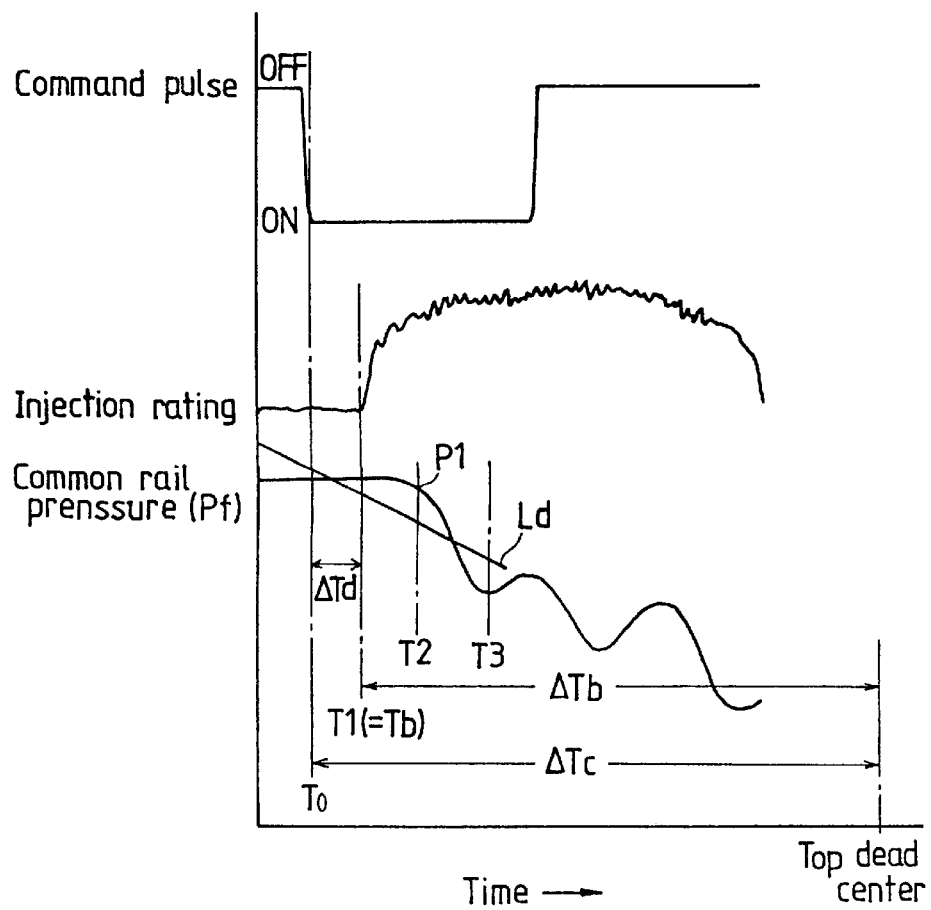
FIG. 1 is a composite graph of several variable, that is, injection command signal or command pulse, injection rating and common rail pressure, versus time in a common rail, fuel-injection system.

First explaining the relations in the injection command signal or command pulse, injection rating and common rail pressure, versus time with reference to the composite graph shown in FIG. 1. Now assuming that a command pulse is turned "ON" at a time $T_0$, or the output timing of an fuel-injection command signal, before the top dead center of the individual cylinder n, the fuel is injected out of the injector 1 at a time $T_1$ for fuel injection after a time interval or time lag $\Delta Td$. An actual common rail pressure Pf in the common rail 2 does not start to fall just after the start of fuel injection, but start to fall with a somewhat time lag. When detecting the pressure drop of the actual pressure Pf in the common rail 2 at a pressure sensor 13, the fuel-supply pump 8 is energized to force the fuel into the common rail 2 thereby restoring the pressure in the common rail 2. A command value $\Delta Tb$ for a desired fuel-injection timing is found, which goes backwards before the top dead center in compliance with the engine operating conditions. A basic desired fuel-injection timing Tb is determined and further the time lag $\Delta Td$ is found depending on the timing of the start of pressure drop in the common rail 2, whereby the output timing $T_0$ of fuel-injection command signal, or command pulse, is determined at the time going backwards by the time lag $\Delta Td$ from the basic desired fuel-injection timing Tb.

The command value $\Delta Tb$ for the desired fuel-injection timing is a command value for defining the basic desired fuel-injection timing Tb at which the fuel injection is to be actually initiated, and found as the time interval going backwards from the top dead center. The command value $\Delta Tb$ for the desired fuel-injection timing is previously mapped in accordance with the engine operating conditions. Under the events where the fuel-injection timing is controlled properly, the time $T_1$ of fuel injection is in coincidence with the basic desired fuel-injection timing Tb. A command value $\Delta Tc$ for fuel-injection timing is the output timing $T_0$ of fuel-injection command signal for the injectors 1, and found as the time interval going backwards from the top dead center. Moreover, the time lag $\Delta Td$ of fuel injection is a time interval or time delay between the output of the fuel-injection command signal and the start of actual fuel injection and, therefore, be as specified for the individual injector. The time lag $\Delta Td$ of fuel injection, when emphasizing the difference for every individual injector, will be hereinafter expressed by $\Delta Td(n)$ to identify the associated cylinder number n.

The main processing procedure of the fuel injection will be described below in conjunction with the flowchart in FIG. 2. It is to be noted that the controller unit for managing the fuel injection of the engine main is enabled for interruption in the main processing procedure at the necessary time interval.

Calculating the engine rpm Ne by a tachometer on the output shaft of the engine, which monitors pulses occurring in accordance with the engine rpm (Step 1, referred to as S1 and so forth).

Calculating the accelerator pedal depression Acc in accordance with signals issued from the accelerator pedal sensor (S2).

Calculating the basic quantity of fuel charge in accordance with the engine rpm Ne given at S1 and the accelerator pedal depression Acc given at S2, in comparison with lookup tables in which are tuned up the previously-stored data about exhaust gases, engine output and comfortable drive-feeling (S3).

The command value $\Delta Tb$ for a desired fuel-injection timing is found, which goes backwards before the top dead center in compliance with the engine rpm Ne given at S1 and the accelerator pedal depression Acc given at S2, and the basic desired fuel-injection timing Tb is calculated (S4). As an alternative, the basic quantity of fuel charge obtained at S3 may be employed instead of the accelerator pedal depression Ace given at S2.

Calculating the common-rail pressure Pf, or the actual pressure in the common rail 2, in accordance with the signals issued from the common rail pressure sensor 13 (S5).

Calculating the desired pressure in the common rail 2 sufficient to obtain the basic quantity of fuel charge in accordance with the engine rpm Ne at some preselected time, or calculating the desired common rail pressure $Pf_0$, by making use of both the engine rpm Ne given at S1 and the basic quantity of fuel charge given at S3 (S6).

The Controller unit 12 regulates the variable stroke, fuel-supply pump 8 such that the common-rail pressure Pf, obtained at S5 is brought into coincidence with the desired common rail pressure Pfo calculated at S6 (S7).

The processing procedure described above is executed repeatedly whenever the engine is operated.

Figure 3:
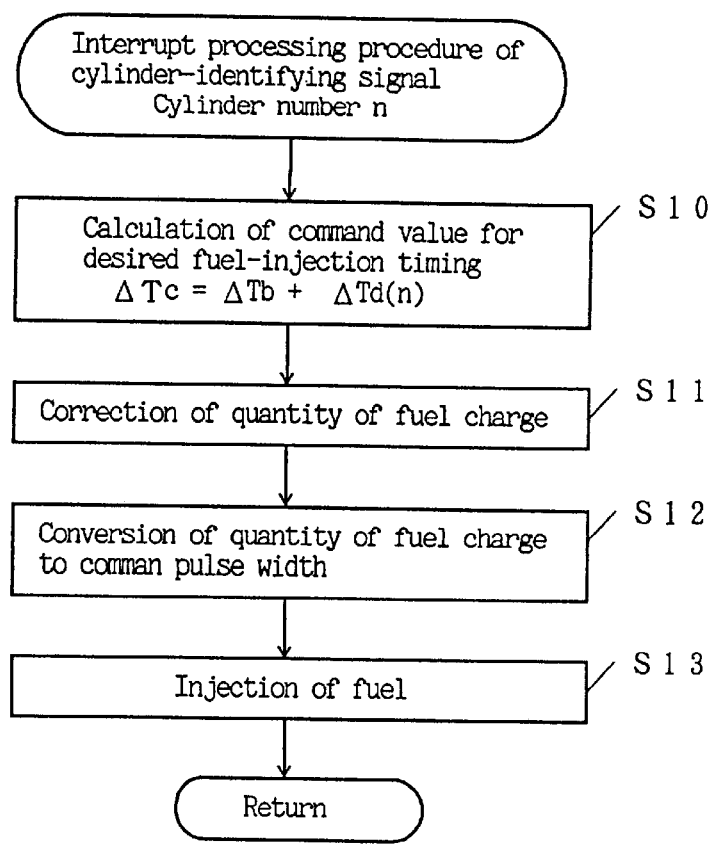
FIG. 3 is a flowchart illustrating an interrupt processing procedure of a cylinder-identifying signal in the execution of the procedure shown in FIG. 2.

The following in conjunction with the flowchart in FIG. 3 is for the interrupt processing procedure of the cylinder-identifying signals. The cylinder number is expressed by n.

Calculating the command value $\Delta Tc$ for fuel-injection timing, given by the following formula;

$$\Delta Tc = \Delta Tb + \Delta Td(n)$$

where $\Delta Tb$ is the command value for a desired fuel-injection timing found at the above S4 and $\Delta Td(n)$ represents the time lag of fuel injection for the cylinder n, which is found along a flowchart described hereinafter (S10). Thus, the $\Delta Td(n)$ is a positive value that may differ for every cylinder. By adding the command value $\Delta Tb$ for a desired fuel-injection timing, which is found in accordance with the engine rpm Ne and the accelerator pedal depression Acc and determined as a length of time going backwards before the top dead center, and the $\Delta Td(n)$ found as described hereinafter, the output timing $T_0$ of an fuel-injection command signal issued from the controller unit 12 is determined at a timing that goes backwards by the command value $\Delta Tc$ for fuel-injection timing from the time of the top dead center.

The quantity of fuel charge is corrected in compliance with the recalculated fuel-injection timing (S11).

The corrected quantity of fuel charge is converted to a pulse width of command pulse for the fuel-injection command signal (S12). In other words, the pulse width of the command pulse applied to the solenoids in the injectors 1 is determined, which pulse width defines a duration during which the solenoid-operated valves are kept open to inject the corrected quantity of fuel.

Actual injection of fuel is executed and the timing and the pulse width of the command pulse are stored in the output register (S13).

Figure 2:
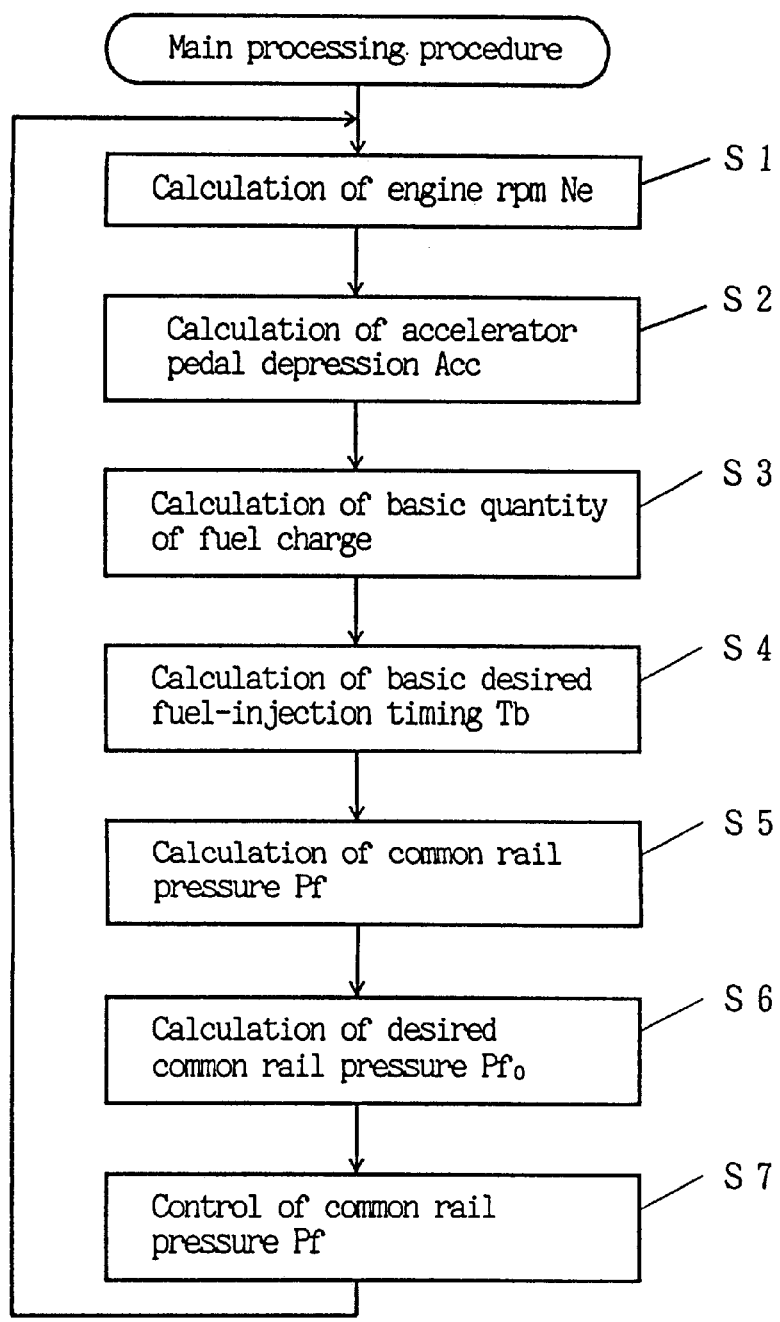
FIG. 2 is a flowchart illustrating a main processing procedure to be executed in a fuel injection according to the present invention.

When the cylinder-identifying signal is detected for the individual cylinder n at the preselected time before the top dead center of the explosion phase or power stroke, the interrupt processing procedure described just above is executed and, after the fuel injection terminates, the main procedure shown in FIG. 2 is resumed.

Figure 4:
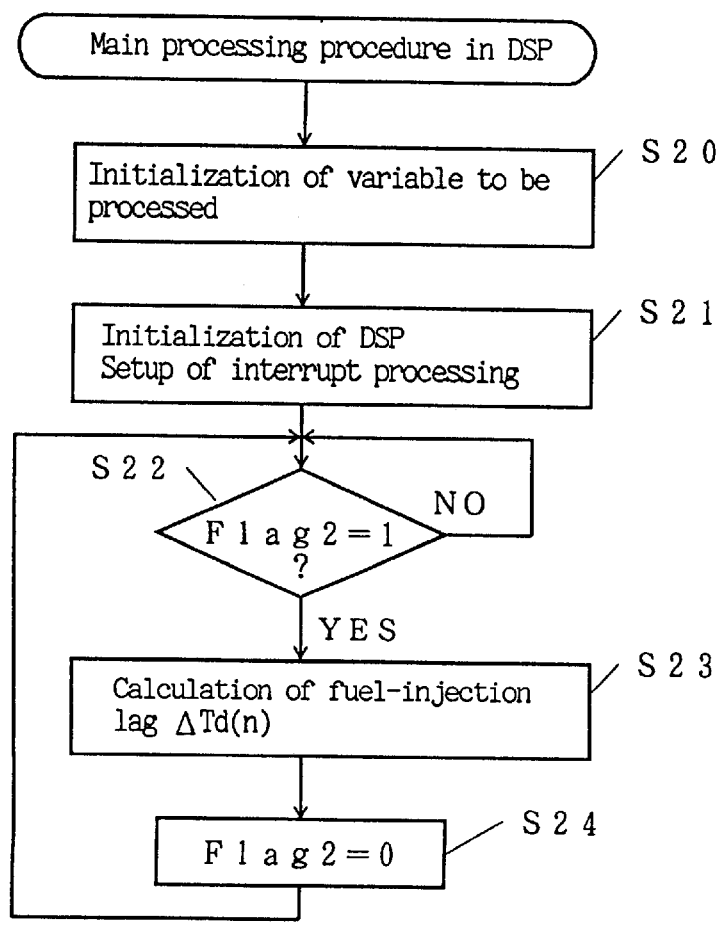
FIG. 4 is a flowchart illustrating a main processing procedure in a digital signal processor, referred to as DSP hereinafter, for calculating an injection lag in the execution of the procedure shown in FIG. 2.

The following in conjunction with the flowchart in FIG. 4 is for the main processing procedure in the digital signal processor, abbreviated to DSP, for calculating the fuel-injection lag $\Delta Td(n)$ described above in S10. The DSP is adopted in this system for parallel processing with CPU because the calculation of the fuel-injection lag requires buffering the vast data and processing the data at high speed in a short time. Nevertheless, the parallel processing by the use of DSP is not necessarily required, provided that the CPU has the sufficient ability of high-speed processing.

Variables to be processed are initialized (S20).

DSP is initialized and the interrupt processing is set up (S21).

Whether the data required for calculating the fuel-injection lag $\Delta Td(n)$ is buffered or not is decided (S22). This decision might be based on the state of a data-buffering ending flag Flag 2. The flag 2 is set up on the 100 KHz interrupt processing described below. With the buffering in ending, the procedure advances to the next step 23. In contrast, when the buffering is not yet in ending, the procedure is made to wait.

Calculating the fuel-injection lag $\Delta Td(n)$ (S23). The details of calculating steps will be explained in conjunction with the flowcharts in FIGS. 5 and 6.

The data-buffering ending flag Flag 2 is cleared to get ready for the storage of data required for the next fuel-injection lag $\Delta Td(n)$ (S24).

Figure 5:
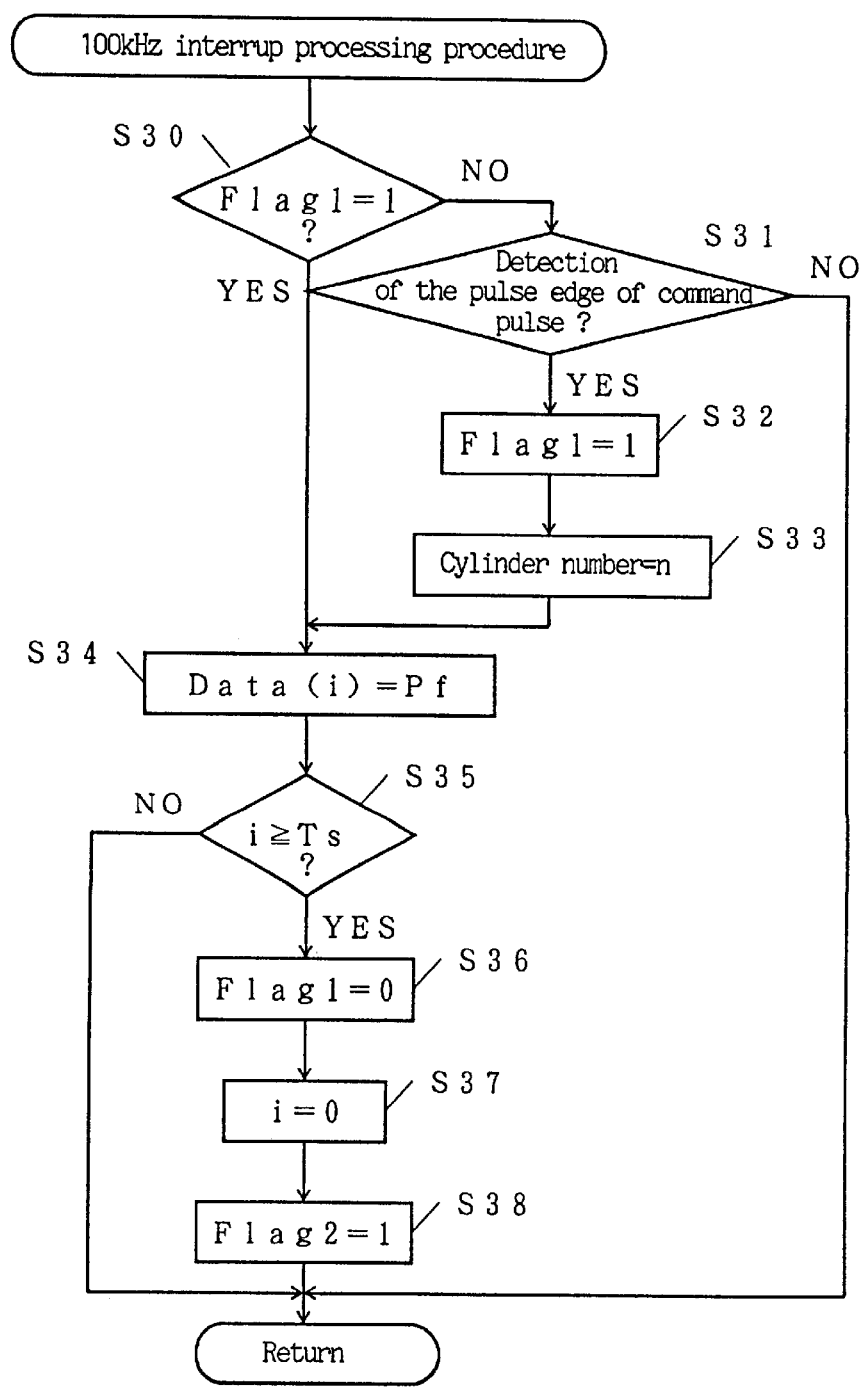
FIG. 5 is a flowchart illustrating a 100 kHz interrupt processing procedure for buffering the data of the common rail pressure to calculate the injection lag in the execution along the flowchart in FIG. 3.

Next, the 100 KHz interrupt processing procedure will be explained with reference to FIG. 5. For calculating the fuel-injection lag $\Delta Td(n)$, values of the common rail pressure Pf are buffered with the cycle of 100 KHz. The buffering is initiated on the timing at which the command pulse to the injectors 1 starts to rise, or turned "ON". The ending of the buffering is preselected so as provide any time enough for confirming the pressure drop and pressure wave in the common rail pressure Pf. That is to say, it is predetermined experimentally with consideration for the injection lag and the somewhat scattering in the common rail pressure.

Whether a flag Flag 1 showing the state under the data buffering is set or not is decided (S30).

Under the data buffering the procedure advances to the step 34, otherwise advances to step 31.

In the absence of data buffering, the pulse edge of command pulse to energize the solenoids in the injectors 1 is detected (S31). The presence of the command pulse edge advances the procedure to the step 32, otherwise the 100 KHz interrupt processing terminates.

Based on the detected command pulse edge or the detection of the injection command signal issued, the flag Flag 1 is set (S32).

Identifying the number of the cylinder provided with the injector applied with the command pulse at that time (S33). The cylinder number n is stored in a memory at the interrupt processing procedure of cylinder-identifying signal.

The common rail pressure Pf is buffered as the data [Data(i)], after having set the flag Flag 1 during data buffering or having detected the command pulse edge (S34).

Deciding as to whether the acquired number of the data(i) as to the common rail pressure Pf is more than or equal to the desired amount Ts (S35). In case where the acquired number of the data i does not reach the desired amount Ts, the procedure returns to S30 to continue the acquisition of the data. In contrast, with the acquired number of the data i reaching the desired amount Ts, the buffering processing terminates and the procedure advances to S36. Since the scattering of the fuel-injection lag $\Delta Td(n)$ is limited in a certain range, the desired amount Ts may be sufficient, that is about several times the largest value of the fuel-injection lag $\Delta Td(n)$.

The flag Flag 1 is cleared (S36).

The buffering counter i for the number of data is cleared (S37).

The data buffering ending flag Flag 2 is set (S38).

Figure 6:
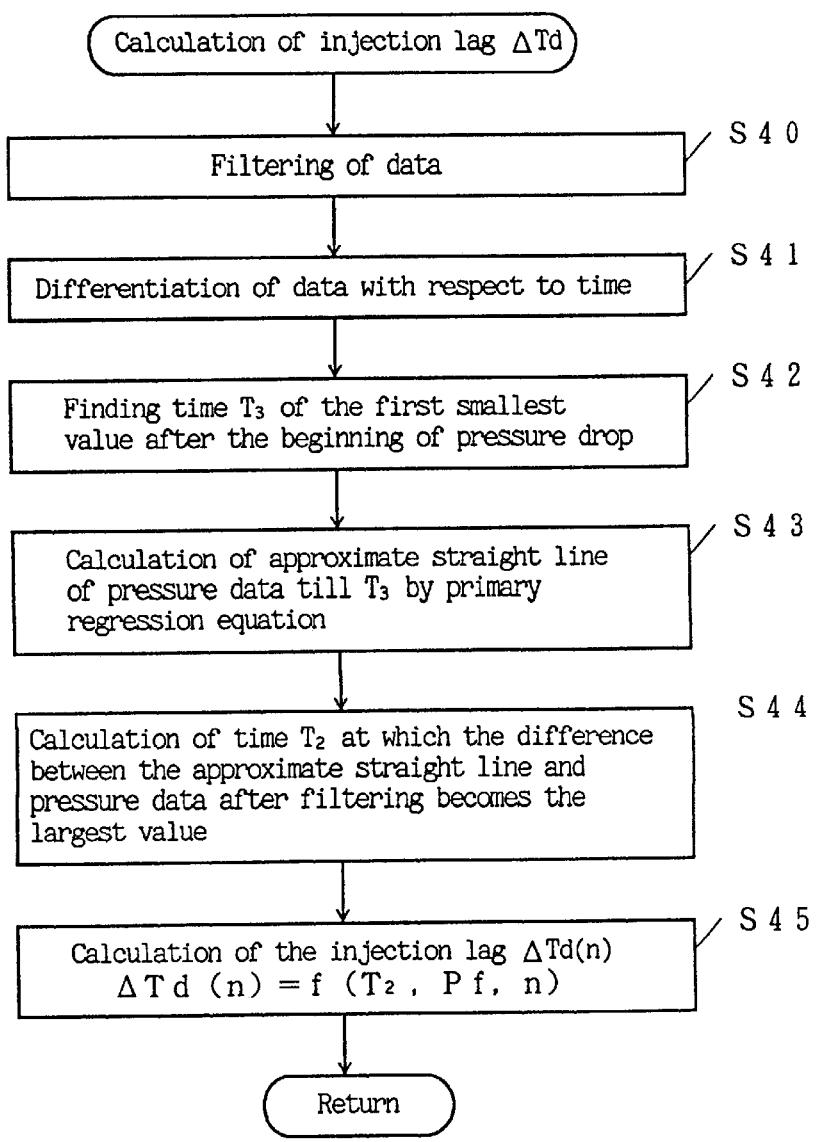
FIG. 6 is a flowchart illustrating a procedure for calculating the injection lag, basing on the buffered data of common rail pressure by the execution along the flowchart in FIG. 5.

Finally, referring to FIG. 6, the following will explain the calculation of the fuel-injection lag $\Delta Td(n)$ on the buffered data of the common rail pressure Pf.

Filtering the data (S40). The data of the common rail pressure Pf detected at the pressure sensor 13 contains usually noise and, therefore, the data is subjected to the filtering processing with a low-pass filter or the like.

Differentiation of the common rail pressure Pf is executed with respect to the time to find the pressure variation on the common rail pressure Pf (S41). As the acquired data about the common rail pressure Pf is the discrete data with respect to the time, the differential calculation may be carried out with the finite differences between any adjoining data values.

Finding a time $T_3$ at which the common rail pressure Pf becomes the first smallest value after the start of the pressure drop thereof, because the acquired population of the data is initiated after the rise of the command pulse has been detected (S42).

Calculating an approximate straight line Ld, shown with a broken line in FIG. 1, of the common rail pressure data on a length of time from the time $T_0$ of the rise of the command pulse to the time $T_3$, by the primary regression equation (S43). That is to say, the approximate straight line Ld of the pressure drop curve on the common rail pressure Pf is calculated with respect to the common rail pressure variation spanning from the time $T_0$ of the rise of the command pulse to the time $T_3$ by the use of the least square method.

Calculating a time $P_1$ at which the difference between the approximate straight line Ld and the common rail pressure Pf after filtering becomes the largest value. The time $P_1$ is recognized as the timing $T_2$ of the start of the pressure drop in the common rail pressure (S44).

Calculating the injection lag $\Delta Td(n)$ resulting from the formula $$\Delta Td(n)=f(T_2, Pf, n) \quad (S45)$$

namely, the injection lag $\Delta Td(n)$ is denoted by the function of the three variables, or the time $T_2$ at $P_1$ where the difference between the approximate straight line Ld and the common rail pressure Pf, is the largest value, the common rail pressure Pf and the cylinder number n, and therefore may be calculated by assigning the values, found actually at the above-described steps, to the associated variables in the function f. The start of the fuel-injection has tendency to retard as the time $T_2$ becomes later. Moreover, the injection lag $\Delta Td(n)$ is related to how far the cylinder number n is from the pressure sensor, namely, further the cylinder is from the common-rail pressure sensor, longer is the injection lag $\Delta Td(n)$. Besides the time $T_2$ and cylinder number n, it may be considered that the injection lag $\Delta Td(n)$ is affected by the difference in the transmitting speeds of the pressure waves owing to the difference in magnitude of the common rail pressure Pf before the start of the pressure drop in the common rail pressure. Now, assuming that there is noor little influence of the difference in magnitude of the common rail pressure Pf, the injection lag $\Delta Td(n)$ may be calculated by the formula $$\Delta Td(n)=f(T_2, n)$$

Although the command pulse, fuel-injection rating and common rail pressure have been explained with respect to the lapse of time in the embodiments described above, other parameter such as crank angle may be used as long as showing substantially the lapse of time.

As this invention may be embodied in several forms without departing from the spirit of essential characteristics thereof, the present embodiment is therefore illustrative and not restrictive, since the scope of the invention is defined by the appended claims rather than by the description proceeding them, and all changes that fall within meets and bounds of the claims, or equivalence of such meets and bounds are therefore intended to embraced by the claims.

What is claimed is:

1. A fuel-injection method for an engine, comprising the steps of; storing a common rail with a fuel delivered by the means of a fuel-supply pump, injecting the fuel from the common rail into combustion chambers through injection holes formed in injectors, which are actuated with injection command signals, making a decision about a basic desired injection timing in compliance with engine operating conditions at present by using a basic desired injection timing data which is previously defined in accordance with the engine operating conditions, finding an injection lag spanning from an output timing of the injection command signal to an injection timing at which the fuel injection is made to start, by a function previously defined of a variable of a time at which a pressure drop starts in the common rail pressure at least after the start of the fuel injection, and making a decision about the output of the injection command signal in accordance with the basic desired injection timing and the injection lag, wherein the timing of the start of the pressure drop in the common rail pressure is defined as a time at which a difference between a pressure data and an approximate straight line is the largest value, the pressure data being obtained by filtering process of waveforms of the detected common rail pressure, and the approximate straight line being calculated, with respect to a curve represented on coordinates of the time and pressure data, by the use of the pressure data spanning from a preselected time before the pressure drop in the common rail pressure to a time of at least the first smallest value after the start of the pressure drop.

2. A fuel-injection method for an engine according to claim 1, wherein the output timing of the injection command signal for the recent fuel injection in the injectors is decided at a time going backwards by the injection lag found at the fuel injection last time in the injectors from the basic desired injection timing.

3. A fuel-injection system for an engine according to claim 1, wherein the output timing of the injection command signal is decided for each of the injectors while the injection lag about from the output timing of the injection command signal to the fuel-injection timing is individually found for every injector.

4. A fuel-injection apparatus for an engine, comprising; a common rail for storing therein a fuel forced by the action of a fuel-supply pump, injectors having injection holes through which the fuel from the common rail is injected into combustion chambers, means for monitoring engine operating conditions, a pressure sensor for monitoring a pressure in the common rail, and a controller unit for deciding a basic desired injection timing in compliance with the-engine operating conditions at present by using a basic desired injection timing data which is previously defined in accordance with the engine operating conditions detected with the engine condition monitoring means, and further for applying the injectors with the injecting command signal in accordance with the basic desired injection timing, wherein the controller unit finds an injection lag spanning from the output timing of the injection command signal to an injection timing at which the fuel injection is made to start, by a function previously defined of a variable of a time at which a pressure drop starts in the common rail pressure at least after the start of the fuel injection, and makes a decision about the output of the injection command signal in accordance with the basic desired injection timing and the injection lag, wherein the controller unit defines a time, at which a difference between a pressure data and an approximate straight line is the largest value, as the timing of the start of the pressure drop in the common rail pressure, the pressure data being obtained by filtering process of waveforms of the detected common rail pressure, and the approximate straight line being calculated, with respect to a curve represented on coordinates of the time and pressure data, by the use of the pressure data spanning from a preselected time before the pressure drop in the common rail pressure to a time of at least the first smallest value after the start of the pressure drop.

5. A fuel-injection apparatus for an engine according to claim 4, wherein the controller unit defines a time going backwards by the injection lag found at the fuel injection last time in the injectors from the basic desired injection as the output timing of the injection command signal for the recent fuel injection in the injectors.

* * * * *